United States Patent
Hatzis

[11] 3,977,709
[45] Aug. 31, 1976

[54] UNIVERSAL INTERFACE GASKET
[75] Inventor: Peter T. Hatzis, Dresher, Pa.
[73] Assignee: Fischer & Porter Co., Warminster, Pa.
[22] Filed: May 8, 1975
[21] Appl. No.: 575,742

[52] U.S. Cl. .......................... 285/368; 285/DIG. 12
[51] Int. Cl.² ........................................ F16L 17/06
[58] Field of Search ............. 285/DIG. 11, DIG. 12, 285/368, 363, 334–335; 277/228, 229, 230

[56] References Cited
UNITED STATES PATENTS

| | | | |
|---|---|---|---|
| 3,124,502 | 3/1964 | Radke ......................... | 285/DIG. 11 |
| 3,207,644 | 9/1965 | Hobson et al. ................ | 285/DIG. 12 |
| 3,212,798 | 10/1965 | Lewis et al. .................. | 285/DIG. 12 |

FOREIGN PATENTS OR APPLICATIONS

| | | | |
|---|---|---|---|
| 834,853 | 5/1960 | United Kingdom .......... | 285/DIG. 12 |
| 955,215 | 4/1964 | United Kingdom ............ | 277/235 B |

Primary Examiner—Dave W. Arola

[57] ABSTRACT

An interface gasket which is interposable between the conical ends of glass pipes to be joined, the gasket being compressed by means of flanges mounted on the pipe ends and interconnected by bolts. The gasket is constituted by an annular sheath whose internal diameter corresponds to the internal diameter of the pipe, the sheath being provided with a rim dimensioned to engage the end of the pipe and encircle its outer diameter, the sheath having a circular channel within which is received a compressible core ring.

1 Claim, 4 Drawing Figures

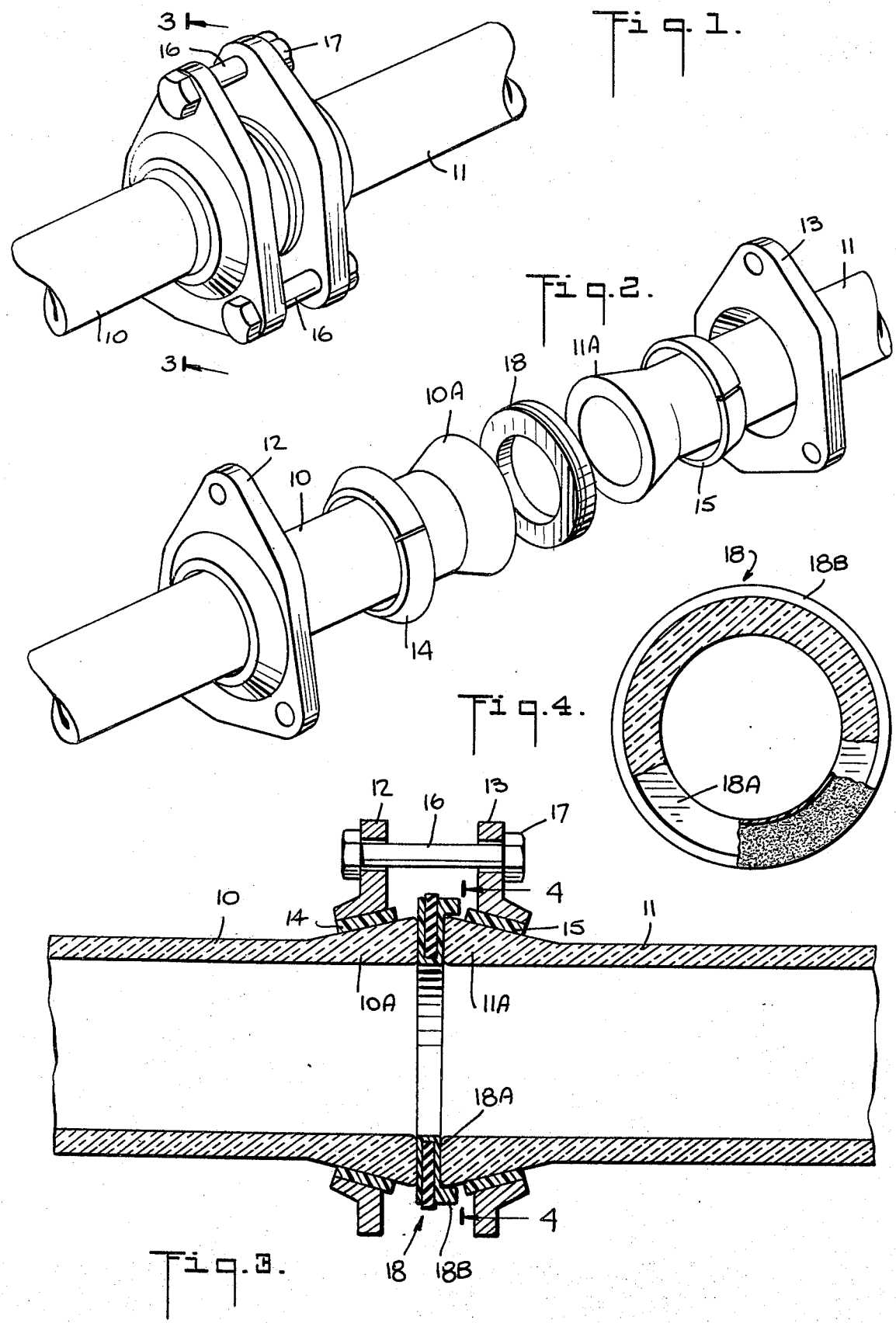

UNIVERSAL INTERFACE GASKET

BACKGROUND OF THE INVENTION

This invention relates generally to joints for glass pipes, and in particular to an interface gasket which is interposable between the adjoining ends of glass pipes.

In industrial and institutional processes as well as in laboratory and pilot plant operations, glass pipes and fittings satisfy the need for high visibility of the flowing product throughout the process and also assure the utmost cleanliness in processing conditions. The pipes and fittings are preferably made of borosilicate glass. This type of glass is capable of operating at temperatures up to 450°F, and because of its heat shock resistance, it tolerates a quick transition from cleaning steam to the flow of cold liquid. Borosilicate glass pipe is highly resistant to chemical attack and neither corrosion nor scale will form on the smooth inner wall thereof.

Glass pipes and fittings are available commercially in various shapes and sizes. Thus one may obtain straight glass pipe in a range of lengths and diameters, and pipes can also be had having a U-bend, a Y-shape or a cross formation. But in all instances the ends of the pipes or fittings have a conical formation to facilitate coupling to like pipes or other process equipment such as glass valves and tanks. Such couplings are generally effected by means of flange sets.

The standard flange set includes a pair of metal flanges having central openings which are large enough to accommodate the ends of the pipes for which they are intended, and a pair of inserts in the form of split rings adapted to surround the conical pipe ends to provide seats for the flanges. Also provided is a group of bolts which pass through bores in the flanges, the bolts being locked to the flanges by nuts. The bolts interconnect the flanges and serve to compress a gasket interposed between the pipe ends and serving to seal the joint therebetween.

The usual interface gasket is formed by a one-piece annular Teflon sheath having a core of Neoprene asbestos or other suitable material, the inner diameter of the sheath being the same as that of the pipe, so that there is no constriction of flow at the pipe joint if the gasket is properly aligned. In order to properly locate the gasket with respect to the pipe, the core is extended beyond the sheath to provide at least three or four tongues having bores therein which register with bores in the flanges.

Thus in assembling a flange set on the ends of adjoining glass pipes, first the insert and flanges are mounted on the pipe ends and then the gasket is interposed between the ends, the bores on the gasket core being aligned with corresponding bores on the flanges. Finally the bolts are passed through the flange bores, two or more of the bolts also going through the bores in the tongues on the gasket, so that when the nuts are applied to the bolts to interconnect the flanges, the gasket is compressed between the pipe ends.

Commercially available flange sets for specified pipe ends are not identical, even though they are intended to fit pipe ends having the same internal and external diameter. Thus in some sets the metal flanges have a generally triangular form and have bores at the corner angles, the three bores lying at equi-spaced points on a bolt circle. In other instances, the flanges have a square configuration, with bores at the four corners. In still other cases, the flanges are in circular disc form.

Hence an interface gasket intended for triangular flanges must have its tongues and bores designed to cooperate with such flanges, while gaskets intended for square flanges must be designed accordingly. Thus, unless the gasket used with a flange set is appropriate to the flanges, there is a danger of gasket misalignment and blow out, even though the gasket otherwise matches the ends of the pipes to be joined.

One must, therefore, with existing types of flange sets, maintain a large inventory of interface gaskets to cooperate with the various types of interface gaskets to cooperate with the various types of flanges in stock. It is not possible to use an interface gasket whose internal diameter matches that of the pipes to be joined unless the alignment holes in the gasket also match the bore holes in the cooperating flanges.

OUTLINE OF DRAWING

For a better understanding of the invention as well as other objects and further features thereof, reference is made to the following detailed description to be read in conjunction with the accompanying drawings, wherein:

FIG. 1 is a perspective view of two pipes which are joined together by a flange set that includes an interface gasket in accordance with the invention;

FIG. 2 is an exploded view of the same set, showing the elements thereof;

FIG. 3 is a longitudinal section taken in the plane indicated by line 3—3 in FIG. 1; and FIG. 4 is a plan view of the interface gasket, partly cut away to show the components thereof.

DESCRIPTION OF INVENTION

Referring now to FIGS. 1 and 2, there is shown a flange set for joining together glass pipes 10 and 11 whose adjoining ends 10A and 11A are in conical form. The flange set is constituted by a pair of identical flanges 12 and 13, a pair of inserts 14 and 15, a group of three bolts 16 and associated nuts 17, and an interface gasket, generally designated by numeral 18.

Flanges 12 and 13, which may be fabricated of aluminum, cast iron or any other suitable material, are of generally triangular form and are provided with corner bores, all of which lie on a bore circle concentric with the ends of the pipes. The inserts 14 and 15 are in the form of split rings, which may be molded of Neoprene asbestos, or silicone rubber, and are adapted to fit over the conical ends of the pipes to provide seats for the flanges. While flanges in triangular form are shown, it is to be understood that any other configuration may be used, since the interface gaskets are capable of cooperating with any form of flange without regard to the location of other bore holes.

Thus when flanges 12 and 13 are seated on inserts 14 and 15, and bolts 16 are passed through the bores of the flanges and locked to the flanges by nuts 17, the interface gasket 18 is compressed between the pipe ends to provide a seal therebetween.

The interface gasket 18 is constituted by a one-piece annular sheath 18A having a circular rim 18B which is dimensioned to encircle and engage the pipe end for which it is intended. Hence the inner diameter of rim 18B matches the largest outer diameter of the conical end of the pipe and the sheath. Sheath 18A is fabricated of a chemically-resistant material which is suitable for the liquid flowing through the glass pipes, for the sheath is the only joint contact with the glass-conveyed liquids. A preferred sheath material is "Teflon" (tetrafluoroethylene). This fluorocarbon polymer provides an almost universal chemical-resistant seal.

Sheath 18A is formed with a circular channel which receives a ring-shaped core 19 of compressible material, such as asbestos, gum rubber, Neoprene, silicone rubber, or Neoprene asbestos. Thus, as shown in FIG. 3, gasket 18, when fitted over the end 11A of pipe 11, is interposed between pipe ends 11A and 10A, with the internal diameter of the sheath matching that of the pipes to provide an unconstricted flow path at the joint. There is no problem of aligning the gasket, for it will fit over any pipe end of the appropriate size, without regard to the nature of the flanges.

While there has been shown and described a preferred embodiment of a universal interface gasket in accordance with the invention, it will be appreciated that many changes and modifications may be made therein without, however, departing from the essential spirit thereof.

I claim:

1. An interface gasket interposed between the conical ends of two glass pipes which are joined together to form a flow line, the gasket being compressed between the pipe ends by means of flanges mounted on the pipe ends and interconnected by bolts to effect a joint seal, said gasket comprising:
   A. an annular one-piece sheath formed of a fluorocarbon polymer having an inner diameter corresponding to the inner diameter of the pipes which are joined, said sheath having only one relatively thick projecting rim having a uniform inner and outer diameter which encircles one of said conical pipe ends and engages only the extremity thereof, and
   B. a ring-shaped core of compressible material received in a circular groove formed in said sheath, said core material being selected from the class consisting of Neoprene-asbestos and silicone rubber, the thickness of the rim being greater than the thickness of the core.

* * * * *